United States Patent [19]

Duplessis et al.

[11] 4,390,983

[45] Jun. 28, 1983

[54] DIGITAL FREQUENCY SENDER

[75] Inventors: Philippe Duplessis, Colombes; Philippe Delpit, Paris, both of France

[73] Assignee: Compagnie Industrielle Des Telecommunications Cit-Alcatel, Paris, France

[21] Appl. No.: 235,818

[22] Filed: Feb. 19, 1981

[30] Foreign Application Priority Data

Feb. 19, 1980 [FR] France ................................ 80 03572

[51] Int. Cl.³ .......................... H03K 13/18; H04J 3/12
[52] U.S. Cl. ......................................... 370/77; 328/14; 370/110.2; 375/59
[58] Field of Search ........................ 328/14, 22, 59, 63; 340/825.52, 825.56, 825.53, 825.58, 825.62, 825.68; 331/1 A; 375/58, 59, 60; 455/38; 370/58, 60, 77, 92, 93, 94, 99, 110.2, 117

[56] References Cited

U.S. PATENT DOCUMENTS 4,171,466 10/1979 Carbrey ............................ 370/110.2
4,172,286 10/1979 Wess ..................................... 328/14

FOREIGN PATENT DOCUMENTS 2007942 5/1979 United Kingdom .

OTHER PUBLICATIONS

Commutation et Electronique No. 59, Oct. 1977, pp. 99-112.
Commutation et Electronique No. 23, Oct. 1968, pp. 43-57.

Primary Examiner—Benedict V. Safourek
Attorney, Agent, or Firm—Sughrue, Mion, Zinn, Macpeak and Seas

[57] ABSTRACT

A digital frequency sender comprises a generator which supplies multi-frequency codes by cyclically scanning a table under the control of a time base (BT). The sender comprises a logarithmic generator (GL) which delivers single-frequency signals, a logarithmic adder (AL) which sums two single-frequency signals in compressed form, and a frequency output unit (DF) controlled by a computer (CAL). The invention is particularly applicable to time division telecommunication exchange division.

6 Claims, 6 Drawing Figures

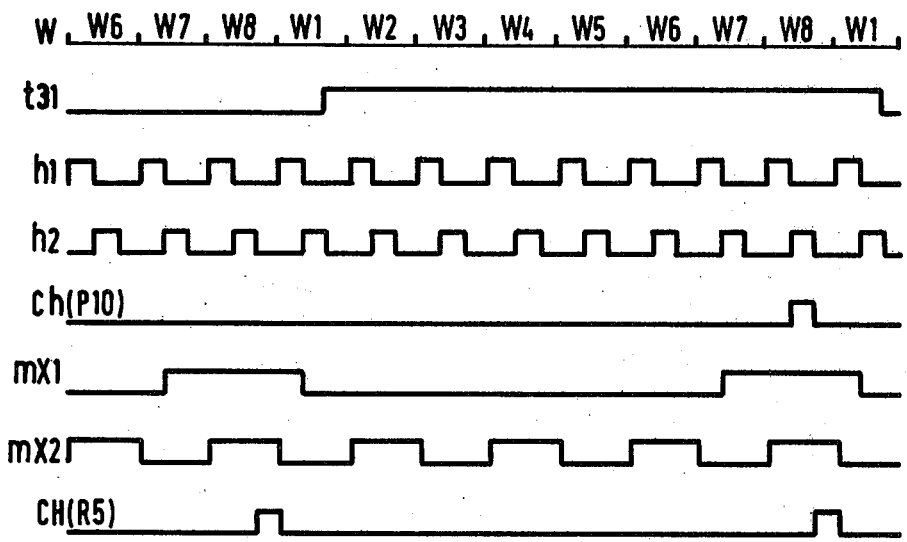

DIGITAL FREQUENCY SENDER

The invention relates to a digital frequency sender controlled by a processor, and more particularly to a digital multi-frequency signalling generator for a time division telephone exchange.

BACKGROUND OF THE INVENTION

Various types of digital signal generator are known: British Pat. No. 1,338,633 entitled "Digital frequency generator" describes a generator which comprises an oscillator and a stabilizing arrangement using a linear digital filter defined by finite differential equations.

U.S. Pat. No. 3,905,030 entitled "Digital signal generator" describes a sine-wave signal generator comprising a table of N values of the function y=sin x, together with means for periodically scanning through the table. The frequency f of the signal is related to the frequency F at which the table is scanned and to the scan step-size a by the equation:

$$f \times N = kF$$

with k having a maximum possible value of k<N/2 as determined by SHANNON's theorem. The generateur described also includes an adding circuit to make it possible to provide a composite signal of two frequencies. Further, it is known that for digital transmission, signals are encoded according to a logarithmic compression law approximated by straight line segments (C.C.I.T.T. recommendation G711 defining the so-called A law).

It may be assumed that encoding in accordance with the A law is approximately logarithmic, such that a code signal Y representative of a voltage V in millivolts has the form:

$$Y = 16\log_2 \frac{|V|}{12}$$

This introduces distortion of a kind that is often acceptable. This form can be used to apply a gain G to a signal by mere addition of encoded values: the code signal X corresponding to the amplified signal G×V can be written:

$$X = 16\left[\log_2 \frac{|V|}{12} + \log_2 G\right] = 16\log_2\left[G \times \frac{|V|}{12}\right]$$

However, to add signals, for example to create two-frequency signals from a sine-wave signal generator, it is necessary to linearize these signals by expansion. One known method of doing this consists in using an approximation which makes it possible to linearize using a shift circuit:

Let S be the expanded signal, such that the compressed signal may be written $\log_2 S = c + m$ (where c is the characteristic and m the mantissa of the logarithm with 0<m<1). The approximation consists in replacing $2^m$ by (1+m), i.e.

$$S = 2^c \times 2^m \simeq 2^c \times (1+m)$$

Expansion consists in shifting the quantity (1+m) by a number of binary places equal to c.

This approximation causes distortion which may be eliminated by using a look-up table giving values of a parameter p as a function of m such that $2^m = 1 + p$, the table being stored in read-only-memory, for example. This method is used, for example, in the digital frequency generator described in British Pat. No. 1,338,633 mentioned above.

The aim of the invention is to provide a circuit enabling the various multi-frequency signals corresponding to the codes used in a telephone exchange to be created on the basis of signals provided by a digital generator, and to output these signals on digital time slots, for example, in PCM type multiplex connections. Creating and outputting the multi-frequency signals is controlled by a processor, for example, a computer controlling the telephone exchange in the event that the telephone exchange is computer controlled.

SUMMARY OF THE INVENTION

The present invention provides a digital frequency sender comprising a generator that supplies multi-frequency code signals by cyclically scanning a table under the control of a time base, said table comprising the value of the sine function in compressed form, the generator comprising amplifier means for amplifying the compressed signals, and the digital sender comprising an adder for combining two single-frequency signals to produce a compressed two-frequency signal, wherein the digital sender further comprises a frequency output unit comprising a memory for storing the two-frequency signals supplied by the adder, sender means for sensing the said two-frequency signals to a digital PCM channel, and selector means controlled by a computer via a data exchange module, with the said selector means being arranged to apply the contents of any word in the said memory to any time slot of the digital PCM channel.

BRIEF DESCRIPTION OF THE DRAWINGS

A preferred embodiment of the invention is described by way of example with reference to the accompanying drawings in which:

FIG. 5 is a wave-form diagram of the main clock signals used in the unit of FIG. 4.

FIG. 6 shows the format of messages exchanged by the sender of FIG. 1 with a computer controlling the telephone exchange.

DESCRIPTION OF PREFERRED EMBODIMENT

In this application, the digital sender delivers single- or two-frequency signals to the multiplexed time slots of a PCM connection, with the signals having the form:

$$A_i \sin 2\pi f_i T + A_j \sin 2\pi f_j T$$

Figure 2:
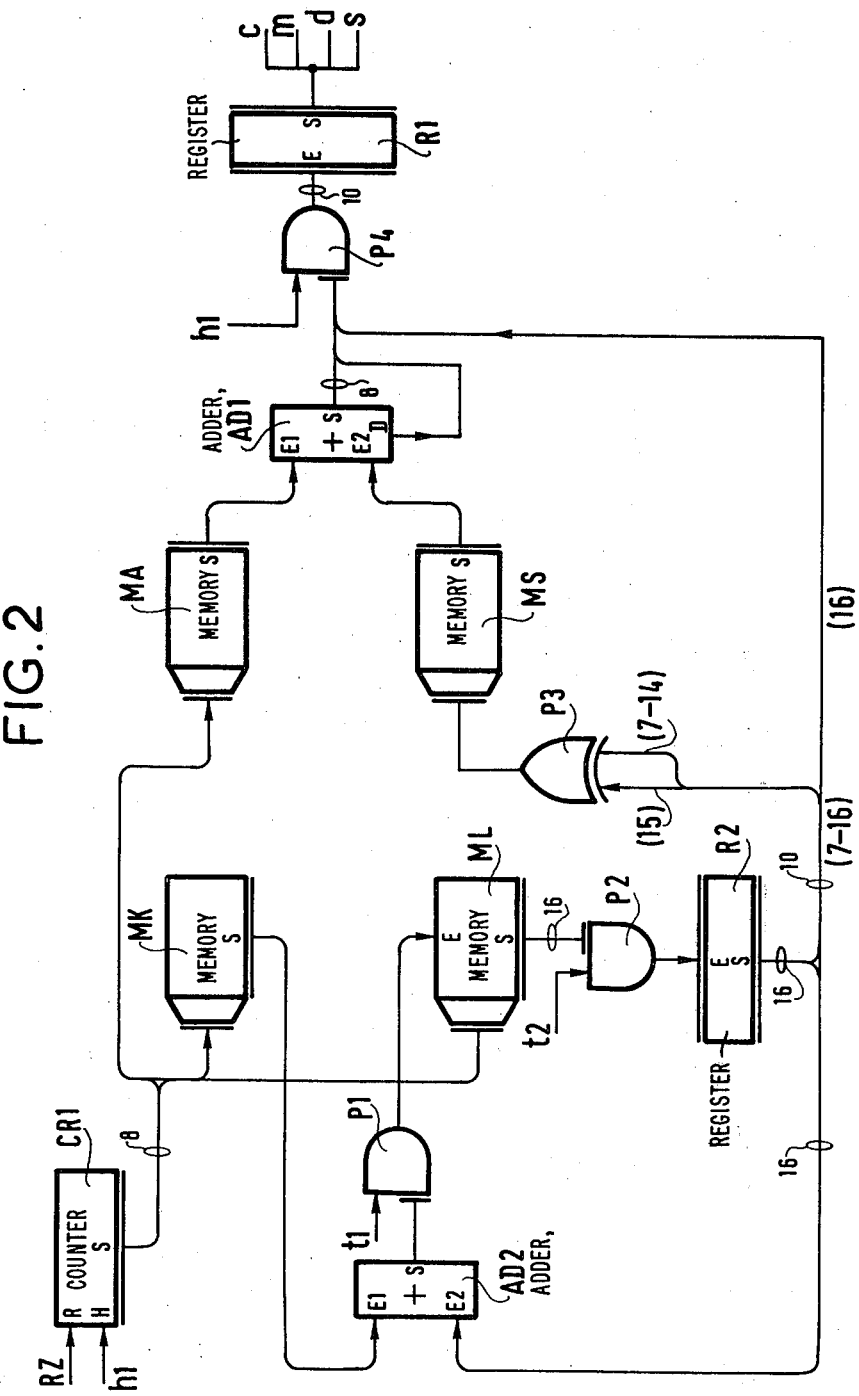
FIG. 2 is a circuit diagram of a generator of amplified single-frequency signals used in the sender of FIG. 2.

The values of f designate the frequencies of the codes being used, and the coefficients A determine the amplitude of the delivered signals. The coefficients A depend on the code in which the frequencies are being sent, and also take into account any loss due to the system up to the PCM connection. As shown below, the coefficients A are stored in compressed form in a memory MA (FIG. 2).

Figure 1:
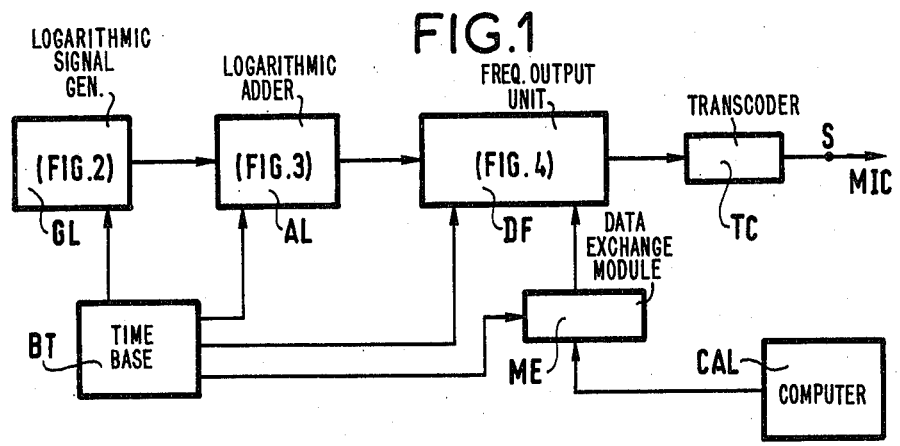
FIG. 1 is a block diagram of a digital sender of telephone signalling codes in accordance with the invention.

In FIG. 1 the digital sender comprises a logarithmic signal generator GL which provides single-frequency signals, a logarithmic adder AL which provides the sum of two single-frequency signals in compressed form and a frequency output unit DF which is controlled by a computer CAL via a data exchange module ME. The circuits GL, AL, DF and ME receive signals from a time base BT, and the computer CAL is the control computer of a centrally-controlled exchange.

At the output of the frequency output unit DF, the signals pass through a transducer TC to match them to the HDB3 code used for transmission on the PCM connection (FIG. 1).

In this application, the generator GL operates cyclically independently from the computer CAL. The generator cycle period is 125 microseconds which is equal to the sampling period of PCM time slots built according to European standards. During each cycle the generator provides a sample of each frequency for each of the codes used. It can thus be seen that there is no need to use the computer at this level since all possible signals are available at each cycle. The memory which stores the coefficients A can thus be a read-only memory.

The generator GL is shown in FIG. 2. This generator provides single-frequency signals of the form indicated above. The sine function is provided by scanning through a table which is stored in the memory MS in logarithmic form. The coefficients A are stored in a memory MA. The word length of the memories MA and MS is 8 bits. The outputs from these memories are connected to the input of an adder AD1 and the output signal from the adder is stored in a register R1.

The output signal from the generator GL has 10 bits: 3 bits for the characteristic part of the logarithm c, 5 bits for the mantissa m, 1 bit d derived from the overflow output of the adder AB1, and 1 bit s indicting the sign of the sine function coming from the output of a register R2.

The output unit provides 128 signal samples per cycle. Given that these are two-frequency signals, the generator has twice that capacity. In this manner, two consecutive samples supplied by the generator GL to the adder AL enable the creation of one two-frequency sample. The generator GL is driven by a signal h1 from the time base BT at the frequency of 2.048 MHz driving a 256 step counter CR1.

The read addresses of the sine table contained in the memory MS for each of the 256 samples are stored in a memory ML. The read step size k of the table for each of the signals is stored in a memory MK. The memories MA, MK and ML are addressed by the counter CR1.

Incrementing the value contained in the memory ML is performed by an adder AD2 having one input E1 connected to the output of the memory MK and the other input E2 connected to the output of the memory ML via the register R2. The connection between the output of the adder AD2 and the input of the memory ML comprises a group of AND-gates P1 which are enabled by a signal t1 from the time base. The connection between the outputs of the memory ML and the input of the register R2 comprises a group of AND gates P2 which are enabled by a signal t2 from the time base.

The sine table comprises 1024 samples. 10 bits are therefore required for addressing purposes. However, if the memories MK and ML have 10-bit long words, the accuracy of frequency choice (equal to the lowest frequency which the system is capable of creating, i.e. corresponding to the minimum value of k) would be insufficient. To obtain lower frequencies, the word length of the memories MK and ML and of the register R2 has been increased to 16 bits, with only the ten most significant bits used to address the table.

In known manner, the memory MS has a capacity of only 256 words since the symmetries of the sine function can be exploited. Two bits (bits no. 15 and 16 at the output of the register R2) determine the quadrant concerned. 8 bits (7 to 14) are used to address the memory MS via a group of EXCLUSIVE-OR gates P3. These 8 bits represent the values of the function in the first quadrant. Bit no. 15 controls the gates P3 to exploit the symmetry of the function along the Y-axis.

Bit no. 16 represents the sign and is applied to the input of the register R1 directly via a group of AND gates P4. The register R1 is synchronized with the counter CR1. To do this its input is controlled by the group of AND gates P4 which are enabled by the clock signal h1. The generator GL is initialized by a signal RZ from the time base which is received at the reset-to-zero input of the counter CR1.

Figure 3:
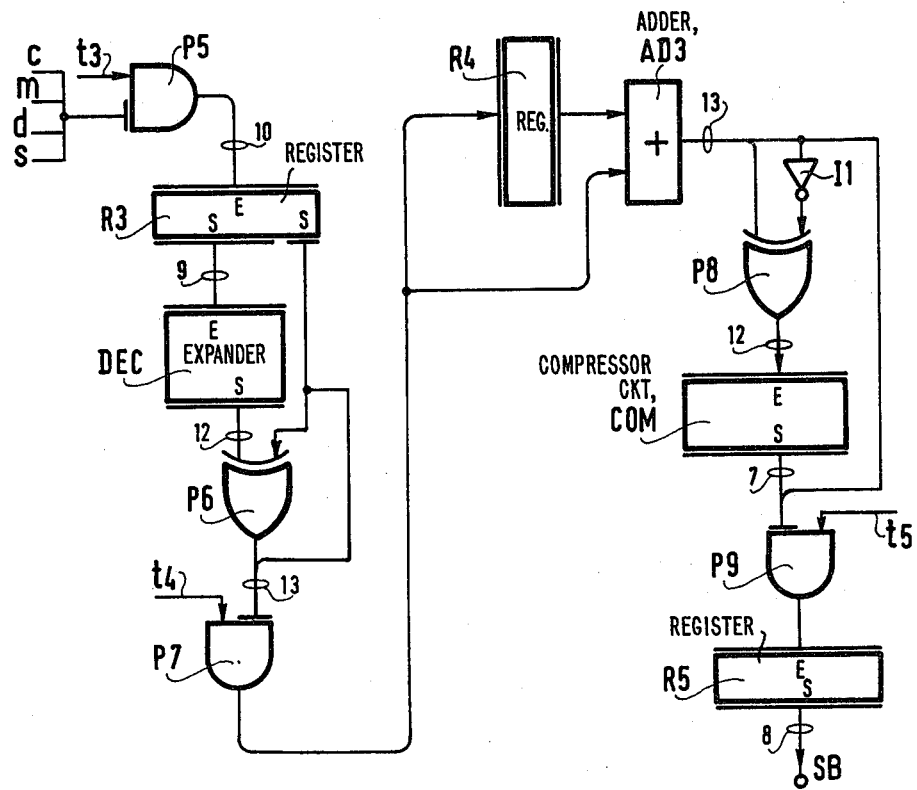
FIG. 3 is a circuit diagram of an adder used in the sender of FIG. 1.

The logarithmic signal adder AL is shown in FIG. 3. The signals received from the generator GL pass through a group of AND-gates P5 which are enabled by clock signal t3 and then enter a register R3 having a capacity of 10 bits. The 10 bits, except for the sign bit s, of the signal are received by an expander circuit DEC. As explained above, this circuit may be a simple shifter circuit, possibly with a table of corrections in read-only memory. After expansion, 12 bits of the linear signal are retained. The output of the circuit DEC is connected to the input of the register R4 via a group of EXCLUSIVE-OR gates P6 and a group of AND gates P7. The gates P6 are controlled by the signal s at the output of the register R3. The gates P7 are controlled by a clock signal t4. The outputs from the groups of gates P7 and from the register R4 are connected to the inputs of an adder AD3 having a capacity of 13 bits. As indicated before, the addition of linear signals performed by adder AD3 concerns two single-frequency signals provided consecutively by the generator GL: the first of these signals is stored in the register R4 and addition is performed after the second signal has appeared at the output of the group of gates P7. The signal at the output of the circuit DEC comprises 12 bits, and the adder works on 13 bits (12 bits plus a sign bit). The output of the adder AD3 is connected to a compressor circuit COM via a group of EXCLUSIVE-OR gates P8. These gates are controlled by the most significant bit of the output of the adder AD3 via an inverter I1. The two-frequency signals supplied by the circuit AL are stored in an 8-bit output register R5 and comprise the characteristic, the mantissa and the sign of the signal. The access of this register is controlled by a group of AND-gates P9 which are enabled by a signal t5 from the time base.

Figure 4:
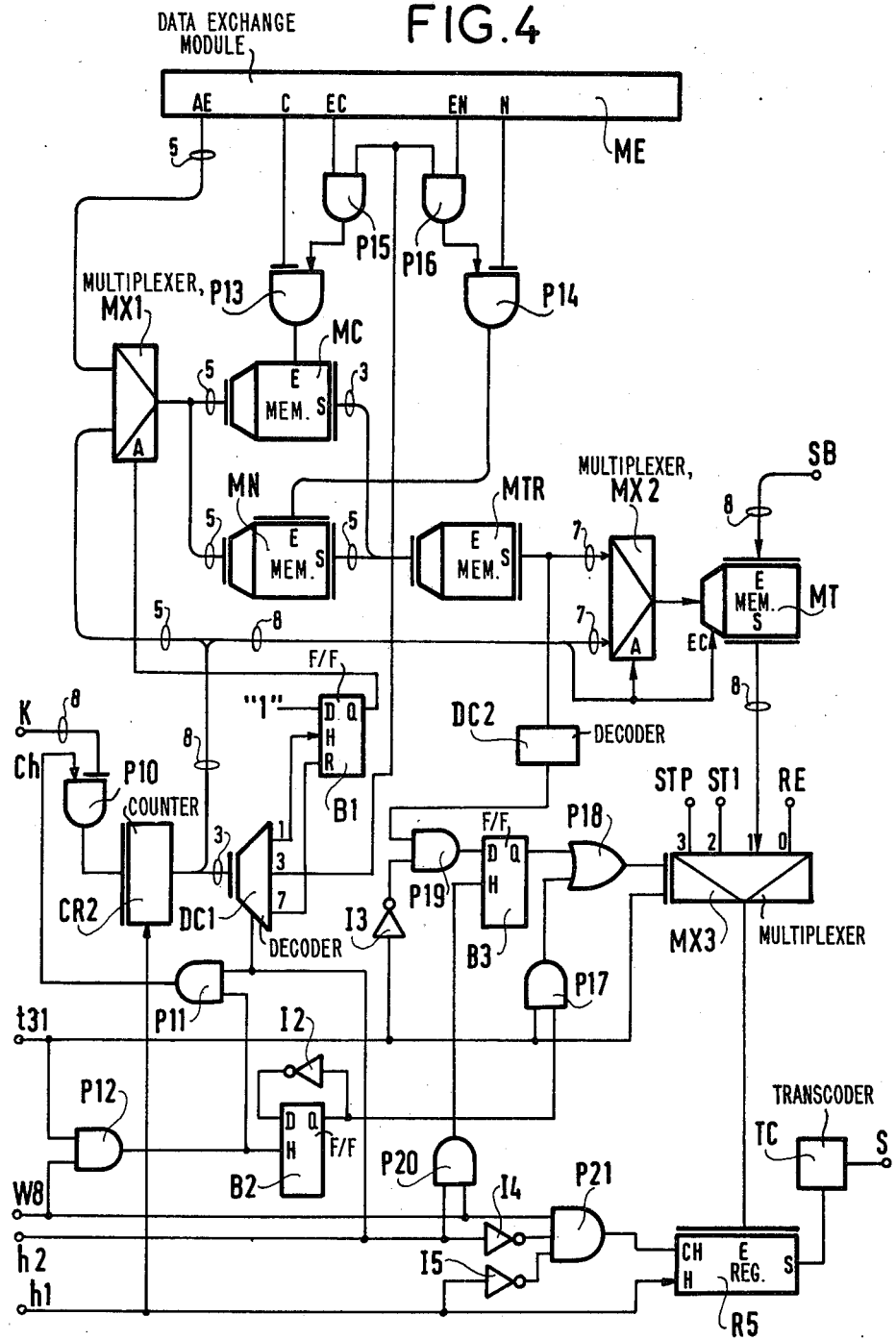
FIG. 4 is a circuit diagram of a frequency output unit used in the sender of FIG. 1.

The frequency output unit DF (FIG. 4) delivers 8-bit encoded frequency samples at its output S. The output S is connected to a PCM connection having 32 time slots and the output unit has an operating cycle whose duration is equal to the operating period of the PCM connection, i.e. 125 microseconds.

To drive and synchronize the output unit, the time base provides the following signals (FIG. 5):

two shifted signals h1 and h2 of the same frequency and equal to the frequency at which bits appear on the PCM channel.

a time slot synchronizing signal w8.

a frame synchronizing signal t31.

The internal operation of the output unit DF is controlled by an 8-bit counter CR2 which is clocked by the pulses of the signal h1. The counter is loaded each cycle with a pre-set value K at that instant when the signals t31, w8 and h2 are present simultaneously (by means of groups of AND gates P10, P11 and P12). The value K is chosen in a manner described below to ensure that the signal is loaded into the output register R5 just before it is sent to the output S.

The frequency signals coming from the output SB of the adder AL are received at the input of a 128-word buffer memory MT. This memory is addressed by the seven most significant bits of the counter CR2 via a multiplexer MX2. The wire which corresponds to the least significant bit is connected to the set input of the multiplexer MX2 and to the memory-write-enable input EC of the memory MT (signal mx2 FIG. 5).

During reading, the memory MT is addressed by the data exchange module ME. The read address is contained in a control memory divided into two parts MC and MN. 3 bits are provided by memory MC as a function of the multi-frequency code to be used. The memory MN provides five further bits used to designate the number of the multi-frequency combination in the code. The memories MC and MN have thirty-two words, thereby enabling each to attribute one frequency combination to each of the time slots of the output PCM channel. During reading, the memories MC and MN are addressed by the five most significant bits of counter CR2, which 5 bits designate the number of time slots being prepared in register R5. The memories MC and MN are addressed via a multiplexer MX1 which has one input receiving the write address AE from the data exchange module and another input receiving the five most significant bits from the counter CR2. Code choice data (C) and frequency choice data (N) are received from the data exchange module via groups of gates P13 and P14 under the control of AND gates P15 and P16 respectively. The AND gates P15 and P16 are enabled by signals EC and EN from the data exchange module.

The three least significant bits of counter CR2 are used to divide each time slot into equal periods (FIG. 5). A decoder DC1 successively enables each of these eight periods w1 to w8. The multiplexer MX1 is controlled by the output of a D-type bistable B1 whose data input is at the "1" state. The clock input H of the bistable B1 is connected to the "1" output of the decoder DC1 and the reset-to-zero input of the bistable B1 is connected to the output 7 from the decoder. The output 3 from the decoder controls the gates P15 and P16, and the outputs of the decoder are only enabled during signal h2. The position of the multiplexer MX1 is indicated in FIG. 5 (signal mx1). When the signal is at "1," the memories MC and MN are addressed from the counter CR2. When the value is 0, they are addressed by the data exchange module (output AE).

To simplify both use and code modification, the memory MT is not addressed directly by the outputs from the memories MC and MN, but via a translation memory MTR.

To send signals on the PCM channel at the output S, the output unit must be capable of sending an idle code RE and frame synchronizing codes to unaffected time slots (the frame synchronizing codes being even frame synchronization STP and odd frame synchronization STI). The connection between the output of the memory MT and the register R5 is provided by a four input multiplexer MX3 whose inputs are connected respectively to receive the codes STP, STI, the output from memory MT, and the code RE. The codes STP and STI are loaded during time slot T31. The most significant addressing bit for the multiplexer MX3 thus receives data T31 from the time base. The parity of the frame is determined by a bistable B2 connected as a two state counter. The clock input H at the bistable B2 is connected to the input of gate P12. The output of the bistable is connected to the least significant addressing input of the multiplexer MX3 via an AND gate P17 that is enabled during time slot t31 and an OR gate P18. The idle code is selected as a function of the value of a word read in the translation memory MTR, and the result is stored in a bistable B3. The output of the memory MTR is connected to the data entry D of the bistable B3 via a decoder DC2 and an AND gate P19 which is enabled at time t31 via an inverter I3. The output of the bistable B3 is connected to one input of the OR-gate P18. A clock input is applied to the bistable B3 at instant w8.h2 by a gate P20). The loading signal CH for the register R5 (FIG. 5) is provided by an AND gate P21 which is enabled at instants w8 and h2 via an inverter I4, and at instant h1 via an inverter I5. Operation of the output unit is thus as follows:

during one operational cycle the memory MT is loaded 128 times by the signals supplied at the output of the adder AL, during the presence of the signal mx2;

for each time slot, one word from the buffer memory is transmitted to the register R5. The memory MT is addressed by the memories MC and MN, themselves being addressed by the counter CR2 (during signal mx1).

During time slot t31 the register R5 is loaded with the contents of a frame synchronizing code.

For each time slot, the computer has the option of intervening via the data exchange module to modify the contents of the memories MC and/or MN (at instant w3.h2).

In this application control of the apparatus in accordance with the invention by the computer may be achieved via an asynchronous series link. In order to control a plurality of devices, the connection for sending messages from the computer towards the devices may, for example, be single and be multiplied over the various devices, and it will also be possible to have a message reporting connection for each device.

For example, it is known to use a data exchange module comprising a shift register in which the series message from the computer is received, and in which a return message is composed. Reference can be made, for example, to French Pat. No. 2 456 437 filed on the 8th of May 1979 by the applicant, published Jan. 9, 1981, and entitled "System for connecting operator positions to an exchange in a digital switching network." The messages may, for example, have the form shown in FIG. 6. A go message comprises a parity code P, an identification number NI to enable the destination device to take account of the message, a function code which indicates the operation to be performed, a time slot number NV which indicates the number of the time slot of the PCM channel to which a code frequency is to be applied, and data D indicating the code to be used and the number of the frequency.

A return message comprises a parity code P, a recognition code R indicating that the data exchange module has recognised, by virtue of the number NI of the send message, that the message was intended for it, a comparison code CP used in cases where the function S requires a test, a code PA indicating the parity of the send message, a code T indicating the type of output unit which processed the message (for the case of where the computer drives several types of unit via the same send connection), and codes F,N,V and D which have the same meaning as for the go message.

We claim:

1. A digital frequency sender comprising a generator for producing as a multi-frequency code signal two single-frequency signals, said generator comprising a first memory, amplifier means, and a time base, said generator producing said multi-frequency code signal by cyclically reading out values from said first memory under the control of said time base, said values representing a sine function in compressed form, and said amplifier means amplifying the compressed signals; an adder for combining said two single-frequency signals produced by said generator to produce a compressed two-frequency signal; a frequency output unit comprising a second memory for storing the compressed two-frequency signal produced by said adder; sender means for sending the said two-frequency signals to a digital PCM channel; a data exchange module; and selector means controlled by a computer via said data exchange module for applying the contents of any word in said second memory to any time slot of the digital PCM channel.

2. A digital sender according to claim 1, further comprising a cyclical digital generator for sending during each cycle at least one sample of each of the frequencies used at a level of amplification determined in accordance with a multi-frequency code and on the particular frequency being sent, a second adder, a third memory containing amplification coefficients in a logarithmic form, with outputs of the first and third memories being connected to corresponding input ports of said second adder, wherein the digital sender further comprises a fourth memory containing, for each single-frequency signal, the address in the first memory of the next sample to be sent, a fifth memory containing, for each sample, an incremental value to be added at each cycle to the contents of the word of the fourth memory, a counter controlled by said time base, said the third, fourth and fifth memories being addressed by said counter and having a capacity equal to the number of samples to be sent during each cycle.

3. A digital sender according to claim 2, wherein only the more significant bits of a word in the fourth memory are used to address the first memory.

4. A digital sender according to claim 1, further comprising a counter driven by the time base with the second memory being a buffer memory that receives samples of the two-frequency signal from the output of the adder, said second memory being addressed for writing by said counter; and a control memory whose capacity is equal to the number of time slots in the digital PCM channel, each word of the control memory comprising a read address of said second memory, and said control memory being addressed for writing by more significant bits of the counter which indicate the number of a PCM time slot to which sending is taking place, and for writing by said computer to enable modification of assignments of the two-frequeny signal to the time slots of the PCM channel.

5. A digital sender according to claim 4, wherein said sender means comprise a multiplexer, a shift register of capacity equal to that of a digital time slot of the PCM channel, and whose input is connected to an output of said multiplexer for enabling said shift register to be loaded either with a selected one of a signal produced at the output of said second memory, an idle code for non-assigned time slots, and a synchronizing signal.

6. A digital sender according to claim 5, further comprising a translator memory, wherein an output of the control memory is connected to a read address input of said second memory via said translator memory.

* * * * *